Feb. 11, 1930.  L. E. WOOLF  1,746,880

LICENSE HOLDER

Filed Feb. 24, 1927

INVENTOR
Lawrence E. Woolf,
BY
ATTORNEYS

UNITED STATES PATENT OFFICE

LAWRENCE E. WOOLF, OF WHITE PLAINS, NEW YORK

LICENSE HOLDER

Application filed February 24, 1927. Serial No. 170,463.

This invention relates to improvements in supports for removably attaching license tags to an automobile and it is an object of this invention to provide means to conveniently and quickly attach or detach a license plate and license plate holder to the automobile.

In the automotive trade, as new and used automobiles, including trucks and tractors, etc., are moved from place to place under their own motive power, it becomes necessary to frequently attach and remove the so called "dealers' plates" or "manufacturers' tags". After perhaps a very short period of time, it may be desirable to remove these license plates. In other words, in receiving a new car or a new lot of cars from storage or from the shipping point, a dealer or manufacturer will attach a set of license plates and move the car as desired. When the car is again stored, or sold, the licenses must be removed as they are the property of the dealer. This alternate removal and replacement of licenses has been an arduous task and, heretofore, has involved a needless waste of time and expense on the part of automobile dealers.

It is therefore, an object of my invention to provide a license plate holder which can be permanently secured to the license plate and quickly secured to or removed from the automobile. Other objects and advantages will appear as the description of the invention proceeds.

In the form of embodiment of the invention illustrated, Fig. 1 is an elevation of a license plate and attached supporting bracket, certain parts being broken away to more clearly illustrate the construction.

Figure 1:
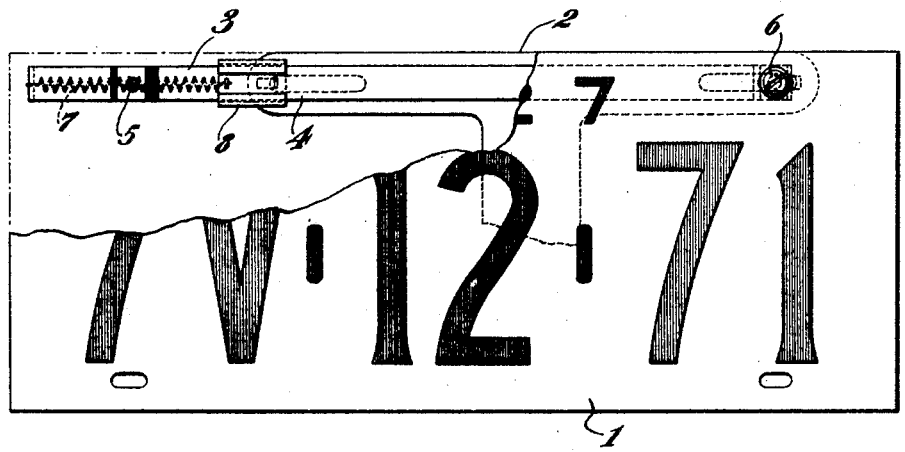
Figure 2:
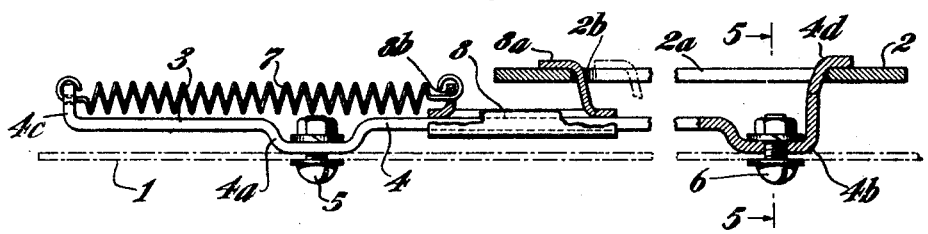
Fig. 2 is a plan view of the improved attaching means and license holder bracket in cross section.
Figure 3:
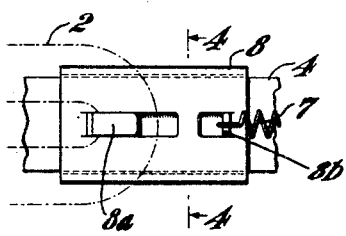
Fig. 3 is a detail showing the movable end of the fastener.
Figure 4:
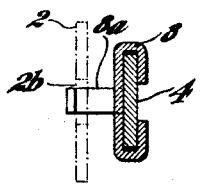
Figure 5:
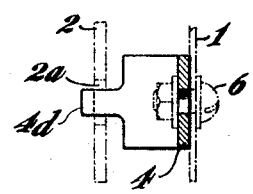

Fig. 4 is a section on the line 4—4 of Fig. 3.
Fig. 5 is a section on the line 5—5 of Fig. 2.
A license identification tag 1 is commonly required by State governments for the registration and operation of all road vehicles including automobiles, trucks and tractors. In vehicles of this type there is usually provided a rear bracket 2 attached to the vehicle frame or spare tire carrier not shown and to which the license tag is fastened, usually by means of a bolt and nut. These parts or the equivalent thereof are found on practically all present day automobiles and are intended to illustrate typical constructions. My invention comprises a holder 3 secured to the license plate 1 and the bracket 2 so as to permit application to or removal from the same with very little inconvenience.

This intermediate fastening means 3 includes a longitudinal bar 4 depressed at $4^a$ and $4^b$ to receive the fastening bolts 5 and 6 for permanent attachment of the license plate, and has upstanding ears $4^c$ and $4^d$ at each end. The ear $4^c$ is apertured to receive the end of a coil spring 7 and the ear $4^d$ of the supporting bar 4 is upstanding and laterally bent to engage in the slot $2^a$ of the license bracket 2. Slidably mounted on the rod or bar 4 is a sleeve 8 with an upstanding and laterally bent ear $8^a$ adapted to engage in the slot $2^b$ of the license support 2. The sleeve 8 is further provided with a second upstanding ear $8^b$, similarly apertured to the ear $4^c$ for receiving the other end of the spring 7.

The operation of this device is as follows: the holder 3 with the sleeve 8 slidable on the bar 4, and drawn by the spring 7 to the left in Fig. 2, is permanently fastened by the bolts 5 and 6 to the license tag 1. This makes a unitary structure and prevents loss or misplacement of the license plate or the holder when removed from the car. When the license tag is to be placed on the vehicle, the projecting ear $4^d$ is inserted in and engages with the end of slot $2^a$ in the bracket 2. The sleeve 8 is next moved to the dotted line position as shown in Fig. 2 and inserted in the notch $2^b$ of the bracket 2 and when released, the spring 7 draws the sleeve 8 and the projecting ear $8^a$ into contact with the end of the notch $2^b$ and thus firmly retaining the license plate and holder on the automobile. The license plate may also be attached by first inserting the ear $8^a$ in the slot $2^b$ and pushing the holder to the left (Fig. 2) expanding the spring 7 until the ear $4^a$ can be slipped into the other end of the slot $2^a$. It is clear that when the license is to be removed, the sleeve 8 is moved away from the notch 2ᵇ and when the ear 8ᵃ is clear, the tag may be removed.

As will be seen, a handy, convenient quickly attached or detached license attaching means, permanently fastened to the license and resiliently placed on the license bracket has been provided which is relatively cheap to manufacture, is convenient for dealers' use, and will efficiently serve its purpose.

Although a preferred embodiment of the invention is shown and described herein, it is to be understood that other modifications may be made therein and that it is my purpose to provide a holder permanently secured to the license plate and removably secured to the automobile, and that such modifications as lie within the scope of the appended claims are considered as within the spirit of my invention.

I claim:

1. In a license plate holder for automotive vehicles, means for permanently attaching the holder to a license plate, means for demountably attaching the license holder and plate to the vehicle comprising a movable sleeve on said holder, resiliently separated catch lugs cooperating with suitable notches on the vehicle, one of said lugs being on said sleeve and the other on said holder, and a spring urging said lugs apart.

2. In a license plate holder, means for permanently securing the holder to the license plate and means for removably securing the holder to an automobile comprising a fixed projection on said holder adapted to engage a slot in the automobile, a movable projection on said holder adapted to engage another slot in the automobile and a single spring means for keeping said movable projection in engagement with said slot.

3. An automobile license plate holder comprising a notched supporting member, a license plate holder permanently attached to a license plate, the holder comprising a rigid upstanding outwardly bent ear and a slidable sleeve comprising a second outwardly bent ear, a spring drawing the above mentioned ears apart, the construction being such that the above mentioned ears may be resiliently held in engagement with the supporting member.

4. In combination with a license tag, a supporting member having slots therein, a bar permanently attached to the license tag, the bar being provided with a sleeve, and an outwardly bent lug to be inserted in the slot on one end of the supporting member, a second locking lug on the sleeve, bent in the opposite direction to engage the slot in the other end of the supporting member, and a spring to resiliently force the two lugs against the opposite ends of the slots in the supporting member to thereby lock the license tag to the supporting member.

5. In a license plate holder for automotive vehicles having a horizontal slotted license support, a unitary holder, means for permanently attaching the holder to a license plate, and means having tensionally separated parts mounted on said holder between said holder and said license plate support for engaging the slots in the aforesaid license plate support, securing the holder to said support.

6. In a license plate holder for automotive vehicles having a horizontal slotted license plate support, a holder bar, means to permanently secure said holder bar to the license plate, and means independent of said permanent securing means to removably secure said license plate to said vehicle license plate support, comprising a fixed projection on said bar projecting into a slot in said license plate support, and a resilient member on said bar engaging said support and cooperating with said fixed projection to hold the fixed projection in said slot.

In testimony whereof I have affixed my signature to this specification.

LAWRENCE E. WOOLF.